United States Patent [19]

Kelly et al.

[11] 4,102,428
[45] Jul. 25, 1978

[54] NO-FLASH SEISMIC CORD

[75] Inventors: Stanley R. Kelly, Simsbury, Conn.; John P. O'Brien; William C. Morrow, both of Littleton, Colo.

[73] Assignee: Ensign-Bickford Company, Simsbury, Conn.

[21] Appl. No.: 738,347

[22] Filed: Nov. 3, 1976

[51] Int. Cl.² .......................... G01V 1/06; C06C 5/00
[52] U.S. Cl. .................................. 181/116; 102/27 R
[58] Field of Search ....................... 102/27 R; 181/116

[56] References Cited

U.S. PATENT DOCUMENTS

| 920,118 | 5/1909 | Ellsworth | 102/27 R |
|---|---|---|---|
| 3,730,097 | 5/1973 | Helfgeni et al. | 102/27 R |
| 3,939,941 | 2/1976 | Steele | 102/27 R X |

FOREIGN PATENT DOCUMENTS

| 1,916,685 | 12/1970 | Fed. Rep. of Germany | 102/27 R |
|---|---|---|---|
| 1,138,655 | 1/1969 | United Kingdom | 102/22 |

OTHER PUBLICATIONS

Condensed Chemical Dictionary, 8th Ed., NY, Van Nostrand Reinhold Co., 1971.

Primary Examiner—S. C. Buczinski
Attorney, Agent, or Firm—Prutzman, Hayes, Kalb & Chilton

[57] ABSTRACT

A seismic explorative system for wilderness areas is described having a nonincendiary high core load linear detonating cord as the seismic energy source. The cord rests on the earth's surface in essentially an uncovered condition and comprises an elongated core of detonating explosive having a core load of about 100–400 grains per foot, an encircling layer consisting essentially of flame quenching particulate material adjacent the core along its entire length, a textile covering circumscribably confining both the core and the encircling layer and a fire retardant outer sheath protectively enclosing the textile covering.

10 Claims, 1 Drawing Figure

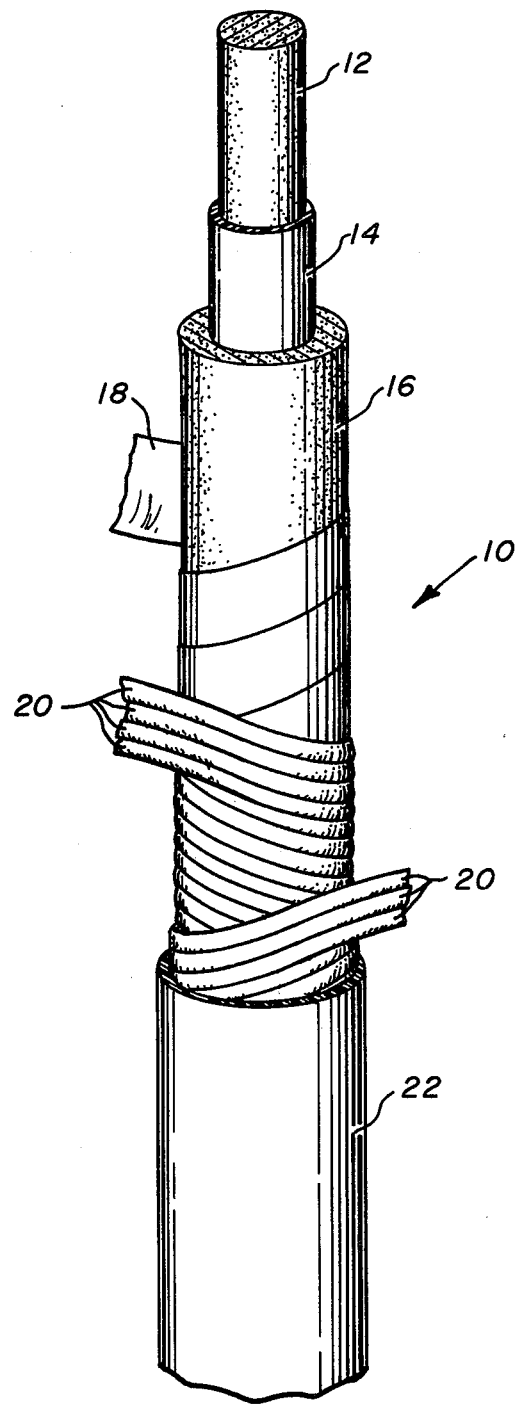

NO-FLASH SEISMIC CORD

BACKGROUND AND SUMMARY OF THE INVENTION

The present invention relates generally to seismic prospecting and in particular is concerned with a new and improved seismic explorative system using a linear detonating cord as the seismic energy source.

As is known, seismic prospecting involves the initiation of an explosive shock wave which sends vibrations through the earth's mantle for partial reflection from layers of rock or other subterranean materials. The returning or reflected vibrations are picked up at the surface by extremely sensitive instruments, known as geophones, and recorded in the form of seismorgrams. The explosive charge for the seismic prospecting operation conventionally is loaded into shot holes or is arranged near the surface in a linear or other appropriate array. In the instance where a linear array is used, lengths of detonating cord are either simply stretched along the surface of the ground or deposited within shallow covered ditches, formed by suitable plows or the like. However, in many areas, such as those designated as "wilderness areas", tractors and certain wheeled vehicles and plows are not permitted other than on established roads or trails, thus preventing the use of truck mounted drills or ditch forming plows. In such areas, portable back-pack drills have been used for drilling shallow holes, known as mini holes. This has proven expensive and the quality of the resultant seismic operation has been less than adequate.

When detonating cord is simply hand deposited on the earth's surface without using a plow, it has been effective in barren or snow-covered areas where the snow provides a tamp to lessen the air blast and quench the fire-ball generated upon firing the cord. However, where the linear cord is deposited on surfaces covered with dry brush and other vegetation, it creates a safety hazard, starting brush fires that not only destroy the vegetation of the wilderness areas but also cause loss of some of the prospector'equipment such as the geophones and line cables. As a result, geophysical activity in such areas has declined drastically and data gathering has been limited to roads and trails where wheeled vehicles can be used and where the chances of incendiary ignition of underbrush is minimal.

Accordingly, it is the object of the present invention to provide a seismic explorative system that obviates the aforementioned disadvantages of mini holes and conventional surface seismic cord by using a nonincendiary linear detonating cord as the seismic energy source.

Another object of the present invention is to provide a seismic explorative system of the type described that utilizes a detonating cord of high core load and improved performance yet is of a construction that will not start a fire.

A further object of the present invention is to provide a system of the type described with the seismic energy source exposed on the surface of the ground, which system produces seismic energy with less unwanted background noise than a conventional cord of equal core load, i.e., an improved signal to noise ratio, and results in a seismogram of higher quality than is obtained with mini holes. Included in this object is the provision for not only high record quality with a surface seismic source but also freedom from the incendiary problems previously associated with the surface use of seismic detonating cord.

Other objects will be in part obvious and in part pointed out more in detail hereinafter.

These and related objects are achieved in accordance with the present invention by providing a seismic explorative system utilizing a nonincendiary high core load linear detonating cord as a seismic energy source with the cord resting on the earth's surface in essentially an uncovered condition. The high core load cord is comprised of an elongated core of detonating explosive having a core load of about 100–400 grains per foot, an encircling layer consisting essentially of flame quenching particulate material adjacent the core along its entire length, a textile covering circumbscribably confining both the core and the encircling layer and a fire retardant outer sheath protectively enclosing the textile covering.

A better understanding of the invention will be obtained from the following detailed description and the accompanying drawing of an illustrative application of the invention.

BRIEF DESCRIPTION OF THE DRAWING

In the drawing; the sole FIGURE is an enlarged perspective view, partially broken away and partially in section, of a nonincendiary seismic detonating cord embodying the features of the present invention.

DESCRIPTION OF A PREFERRED EMBODIMENT

Referring now to the drawing in greater detail, a detonating cord 10 used as a seismic energy source in the system of the present invention is shown as having a core structure similar to a conventional detonating cord but having the core surrounded by a number of different confining layers or coverings including a flame quenching layer which protectively encloses the explosive core. The flame quenching layer preferably takes the form of particulate or granular material which tends to blanket and absorb the hot fire ball produced by the detonating explosive within the core without adversely affecting the energy transmission along the linear extent thereof.

As shown in the preferred embodiment, cord 10 includes a central core 12 of detonating explosive material enclosed within one or more layers, such as the plastic sleeve 14 typically used in conventional detonating cord. The core 12 may be of any high velocity explosive conventionally used for detonating cord, such as PETN, PDX, HMX or the like but is of a higher core load than most conventional detonating cords. Accordingly, it exhibits a core load well in excess of the 40 grains per foot used in most conventional detonating cords. Preferably, a core load of about 100–400 grains per foot is used in commercial seismic operations. The preferred explosive material is PETN and when that explosive is used the core load falls primarily within the center of the indicated range with excellent results being obtained at a core load of about 200–250 grains per foot.

If desired, the core may consist solely of the high velocity explosive material. However, as mentioned, the core assembly preferably takes a form similar to a conventional detonating fuse in that the granular explosive material within the core 12 is confined within a suitable confining sleeve or wrapping 14 of one or more layers such as layers of textile, plastic and the like. Due to the preferred high core load of the explosive core 12, this initial covering 14 will not confine the fire ball generated upon detonation of the cord. Accordingly, the present invention provides for encirclement of the core by a layer 16 which consists essentially of a flame quenching material. This material is positioned in intimate, adjacent relationship to the core along its entire length and consists of flame quenching and cooling material that absorbs both the flash and flame of the detonating explosive within the core. The material is preferably in particulate or granular form for ease of manufacture and effectiveness of operation. The materials most effective from both a manufacturing and performance standpoint are inorganic salts, such as diammonium phosphate, sodium bicarbonate, potassium chloride, sodium chloride and the like. As will be appreciated, other known flame quenching material may be used with comparable results.

The flame quenching material is usually present in amounts approximately equal to or slightly more or less than the weight of the explosive within the core. Consequently, the cooling salts are present in amounts of about 100–450 grains per foot and preferably about 250 grains per foot when the cord has a core load of about 200 grains per foot of PETN.

The flame quenching layer 16 is covered by a plastic tape 18 or similar confining layer which is turn in confined by countering strands 20 of textile over-braid or over-wrap. The plastic tape 18 is used in the preferred embodiment to confine the particulate material in layer 16, but is an optional portion of the detonating cord construction. As will be appreciated, the layer 16 may be formed without the need for confinement or the confining function could be accomplished by the textile over-wrap which circumscribably confines both the core and the encircling layers to fully enclose the high explosive core 12 and its flame suppressing outer layer 16.

The textile covering provides strength and toughness to the linear detonating cord, without adversely affecting the flexibility thereof. It is of the type conventionally used in detonating cord and consists of yarn such as rayon, cotton, fibrillated polypropylene or the like. The textile strands 20 are shown as wrapped and counter-wrapped to provide a flexible, yet tough covering for the operative layers of the detonating cord. However, variations on the manner in which the strands cover and confine layer 16 may also be used.

Finally, an outer plastic sheath 22 is applied over the textile wrapping to protectively enclose the assembly and reduce the possibility of rupture of the wrapping during use. In accordance with the present invention, the sheath 22 is a flame retardant plastic material such as polyethylene, vinyl copolymers and the like having flame retardant materials incorporated therein. The flame retardant plastic provides an added barrier to the flash and flame of the core 12 and may be of any suitable commercially available grade, such as that flame retardant polyethylene sold in concentrate form by Monmouth Plastics, Inc., of New Jersey, under the designation of "PE Concentrate 101". It is believed that such material contains a flame retardant of the aliphatic bromine type, such as the material sold by Cities Service, Co., under the trade designation "CITEX BN-451".

EXAMPLES

As an example of the effectiveness of the seismic detonating cord of the present invention, the following comparative tests were conducted. A fifty-foot length of seismic detonating cord constructed in accordance with the teaching of this application was placed along a road, covered with dry hay and the hay was soaked with gasoline. The cord had a core load of 200 grains per foot PETN and a flame quenching layer of diammonium phosphate at a load level of 250 grains per foot. Upon detonation of the cord, no flash was observed and no fire was started in the gasoline soaked hay. Subsequently, a length of detonating cord having a core load of 200 grains per foot PETN but having no flame quenching layer of the type described therein was covered with dry hay but gaoline was not applied. The cord was detonated resulting in an observable flash and ignition of the hay.

A second length of cord made in accordance with the present invention as described hereinbefore was placed along one side of a road and an equal length of conventional detonating cord of equal core load was placed on the opposite side of the road. The cords were initiated simultaneously and the fire ball flash from the conventional cord was clearly evident while no flash was observed in the cord made in accordance with the present invention.

Direct comparisons have also been made between the cord made in accordance with the present invention and conventional cords of similar core load resting on the surface with regard to the useful seismic energy and the degree of unwanted background noise. As a result of these tests, it was found that the cord produced in accordance with the present invention provided more useful energy and less unwanted background noise pickup than the conventional cord. Similar tests conducted to compare the effect of the cord of the present invention with seismograms obtained from mini holes resulted in seismograms of higher quality when utilizing the seismic detonating cord of the present invention.

As will be apparent to persons skilled in the art, various modifications, adaptations and variations of the foregoing specific disclosure can be made without departing from the teachings of the present invention.

We claim:

1. In a seismic explorative system using a linear detonating cord as a seismic source with the cord resting on top of the earth's surface in essentially an uncovered condition, the improvement wherein the linear detonating cord is a high core load nonincendive cord providing enhanced useful seismic energy and reduced background noise, comprising an elongated core of detonating explosive having a core load of about 100–400 grains per foot, a layer encircling said core and consisting essentially of particulate flame quenching material adjacent said core along the entire length thereof and positioned between said core and the earth's surface when the cord is resting on said surface, the load level of the flame quenching material being about equal to the core load of the explosive and having a load level of about 100–450 grains per foot, and a flame retardant outer sheath confining and protectively enclosing both said core and said encircling layer.

2. The system of claim 1 wherein the detonating explosive is PETN and the flame quenching material is an inorganic salt.

3. The system of claim 1 wherein the flame quenching material is diammonium phosphate.

4. The system of claim 1 wherein the core is PETN at a core load of 200 grains per foot and the flame quenching layer is diammonium phosphate.

5. The system of claim 4 wherein the flame quenching layer is a particulate material and has a load level of about 250 grains per foot.

6. The system of claim 1 wherein a textile covering is interposed between the outer sheath and the flame quenching layer.

7. The system of claim 6 wherein the textile covering is polypropylene yarn.

8. In a method of seismic prospecting, the combination providing improved useful seismic energy and reduced background noise, comprising the steps of depositing lengths of nonincendiary seismic detonating cord on the earth's surface in essentially an uncovered condition; said seismic cord comprising an elongated core of detonating explosive having a core load of about 100–400 grains per foot, an encircling layer consisting essentially of flame quenching material adjacent said core along the entire length thereof and positioned between said core and the earth's surface, the load level of the flame quenching material being about equal to the core load of the explosive and having a load level of about 100–450 grains per foot, and a flame retardant outer sheath confining and protectively enclosing both said core and said encircling layer; detonating said core and recording the vibrations received as a result of said detonation.

9. The method of claim 8 wherein the explosive is PETN.

10. The method of claim 9 wherein the PETN has a core load of 200 grains per foot and the flame quenching layer is diammonium phosphate.

* * * * *